US011066334B2

United States Patent
Bao

(10) Patent No.: US 11,066,334 B2
(45) Date of Patent: Jul. 20, 2021

(54) BINDERLESS CBN SINTERING WITH CUBIC PRESS

(71) Applicant: Smith International, Inc., Houston, TX (US)

(72) Inventor: Yahua Bao, Provo, UT (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 8 days.

(21) Appl. No.: 16/309,660

(22) PCT Filed: Jun. 27, 2017

(86) PCT No.: PCT/US2017/039363
§ 371 (c)(1),
(2) Date: Dec. 13, 2018

(87) PCT Pub. No.: WO2018/005406
PCT Pub. Date: Jan. 4, 2018

(65) Prior Publication Data
US 2019/0177236 A1 Jun. 13, 2019

Related U.S. Application Data

(60) Provisional application No. 62/356,225, filed on Jun. 29, 2016.

(51) Int. Cl.
*C04B 35/645* (2006.01)
*C04B 35/58* (2006.01)
(Continued)

(52) U.S. Cl.
CPC ........ *C04B 35/5831* (2013.01); *C04B 35/645* (2013.01); *C04B 2235/386* (2013.01);
(Continued)

(58) Field of Classification Search
CPC .................................................. C04B 35/583
See application file for complete search history.

(56) References Cited

U.S. PATENT DOCUMENTS 4,150,098 A  4/1979  Sirota et al.
4,188,194 A  2/1980  Corrigan
(Continued)

FOREIGN PATENT DOCUMENTS

GB  2002333 A  2/1979
JP  H03159964 A  7/1991
(Continued)

OTHER PUBLICATIONS

Taniguchi, Takashi, et al. "Sintering of Cubic Boron Nitride without Additives at 7.7 GPa and above 2000 ° C." Journal of Materials Research, vol. 14, No. 1, 1999, pp. 162-169., doi: 10.1557/jmr.1999.0024. (Year: 1999).*

(Continued)

*Primary Examiner* — Alison L Hindenlang
*Assistant Examiner* — Andrés E. Behrens, Jr.

(57) ABSTRACT

A method of sintering a binderless cBN body includes providing a boron nitride particle mixture into a pressure chamber, the boron nitride particle mixture having a first type of boron nitride particles and boron nitride filler particles, and the boron nitride filler particles having a different size and/or type than the first type of boron nitride particles, and sintering the boron nitride particle mixture in the pressure chamber to form the cBN body by generating a pressure in the pressure chamber of less than 7.7 GPa and heating the boron nitride particle mixture to a temperature ranging from about 1900° C. to about 2300° C., wherein the cBN body has a density of at least 97 percent.

15 Claims, 4 Drawing Sheets

|  | 1950°C | 2075°C | 2175°C |
|---|---|---|---|
| cBN, 01-089-1498 | 98.5 | 99 | 99.8 |
| WC, 01-073-9874 | 0.043 | 0.034 | 0.046 |
| hBN, 01-076-9893 | 1.2 | 0.41 | 0.02 |
| H3BO3, 01-071-3790 | 0.31 | 0.6 | 0.15 |

(51) Int. Cl.

| | | |
|---|---|---|
| C04B 35/583 | (2006.01) | |
| C04B 35/5831 | (2006.01) | |
| C04B 35/5833 | (2006.01) | |
| C04B 35/64 | (2006.01) | |

(52) U.S. Cl.
CPC ........... *C04B 2235/5436* (2013.01); *C04B 2235/5445* (2013.01); *C04B 2235/5472* (2013.01); *C04B 2235/604* (2013.01); *C04B 2235/762* (2013.01); *C04B 2235/767* (2013.01); *C04B 2235/77* (2013.01); *C04B 2235/95* (2013.01); *C04B 2235/96* (2013.01)

(56) References Cited

U.S. PATENT DOCUMENTS

| | | | | |
|---|---|---|---|---|
| 5,271,749 | A | * | 12/1993 | Rai .................... B24D 3/06 501/87 |
| 5,691,260 | A | | 11/1997 | Suzuki et al. |
| 6,071,841 | A | * | 6/2000 | Sumiya ............. C04B 35/5831 423/290 |
| 7,404,832 | B2 | * | 7/2008 | Ohtsubo ............. C04B 35/645 51/307 |
| 8,382,868 | B2 | | 2/2013 | Goudemond et al. |
| 8,657,893 | B2 | * | 2/2014 | Wardoyo .......... C04B 35/63432 51/293 |
| 9,416,304 | B2 | | 8/2016 | Ishida et al. |
| 9,422,161 | B2 | | 8/2016 | Dongli Yu |
| 9,522,850 | B2 | | 12/2016 | Matsuda |
| 2008/0302023 | A1 | * | 12/2008 | Goudemond ........... B24D 3/06 51/309 |
| 2015/0298290 | A1 | | 10/2015 | Ishida et al. |
| 2016/0318808 | A1 | * | 11/2016 | Kasonde .............. E21B 10/567 |

FOREIGN PATENT DOCUMENTS

| | | | |
|---|---|---|---|
| JP | 2590413 | B2 | 3/1997 |
| JP | H11246271 | A | 9/1999 |

OTHER PUBLICATIONS

Funk J.E., Dinger D.R. (1994) Fundamentals of Particle Packing, Monodisperse Spheres. In: Predictive Process Control of Crowded Particulate Suspensions. Springer, Boston, MA (Year: 1994).*
Akaishi, M., Satoh, T., Ishii, M. et al. Synthesis of translucent sintered cubic boron nitride. J Mater Sci Lett 12, 1883-1885 (1993). https://doi.org/10.1007/BF00882529 (Year: 1993).*
"Drying & Firing." Materials Science and Engineering: an Introduction 8e, by William D. Callister, John Wiley & Sons, 2012, pp. 521-522. (Year: 2012).*
"Boron Nitride." Wikipedia, Wikimedia Foundation, Jun. 23, 2016, web.archive.org/web/20160623212914/en.wikipedia.org/wiki/Boron_nitride#Preparation_of_cubic_BN. (Year: 2016).*
Funk, James E., and Dennis R. Dinger. Predictive Process Control of Crowded Particulate Suspensions: Applied to Ceramic Manufacturing. Kluwer, 2001 (Year: 2001).*
Hansen, Tony. Drying Shrinkage, Jan. 6, 2016, digitalfire.com/glossary/drying shrinkage. (Year: 2016).*
International Search Report and Written Opinion issued in International Patent application PCT/US2017/039363 dated Sep. 28, 2017, 10 pages.
Akaishi et al., "Synthesis of translucent sintered cubic boron nitride"Journal of Materials Science Letters, vol. 12, pp. 1883-1885 (1993).
Sumiya et al., "Mechanical properties of high purity polycrystalline cBN synthesized by direct conversion sintering method" Journal of Materials Science, vol. 35, pp. 1181-1186 (2000).
Taniguchi, T., High-pressure synthesis of binderless cubic boron nitride sintered bodies, The Reiview of High Pressure Science and Technology, V.21 (2011) No. 4, 292-299.
Taniguchi, t., et al, Sintering of cubic boron nitride without additives at 7.7GPa and above 2000° C., Journal of Materials Research, 1 (1999), 162-169.
Liu G., et al, Submicron cubic boron nitride as hard as diamond, Applied Physics Letters, 98 (2011 ), 203112.
International Preliminary Report on Patentability issued in International Patent application PCT/US2017/039363, dated Jan. 1, 2019, 6 pages.
First Office Action and Search Report issued in Chinese Patent Application 201780039792.5 dated Mar. 24, 2021.
Office action issued in Japanese patent application 2018-567864 dated Mar. 18, 2021.

* cited by examiner

| | 1950°C | 2075°C | 2175°C |
|---|---|---|---|
| cBN, 01-089-1498 | 98.5 | 99 | 99.8 |
| WC, 01-073-9874 | 0.043 | 0.034 | 0.046 |
| hBN, 01-076-9893 | 1.2 | 0.41 | 0.02 |
| H3BO3, 01-071-3790 | 0.31 | 0.6 | 0.15 |

BINDERLESS CBN SINTERING WITH CUBIC PRESS

CROSS-REFERENCE TO RELATED APPLICATION

This application claims priority to and the benefit of U.S. Provisional Application No. 62/356,225, filed on Jun. 29, 2016, the entirety of which is incorporated herein by reference.

BACKGROUND

Cubic boron nitride (cBN) particles may be sintered together in the presence of a ceramic or metallic binder to form a polycrystalline cubic boron nitride (PCBN) composite material having designed material properties, such as increased wear resistance or toughness. For example, PCBN composite materials may be formed by high-pressure high-temperature (HPHT) sintering of a mixture including cBN particles as a hard phase (e.g., an ultra-hard material), and aluminum (Al) metal powder, which becomes a liquid sintering reactant. HPHT sintering of PCBN may include using pressures of between about 4-7 GPa and temperatures of between about 1200° C. and 1500° C. In some applications, cBN particles may be sintered together without use of a binder in a binderless cBN sintering process. However, known binderless cBN sintering processes include use of ultra-high pressures greater than 7.7 GPa and high temperatures greater than 2000° C. (e.g., between 2200° C. and 2400° C.). Such ultra-high pressure and high temperature conditions may be difficult and costly to achieve compared to the pressure and temperature conditions used for forming PCBN.

PCBN may be used in a variety of machining applications including, for example, in tools for friction stir welding, processing, or joining. A tool used for friction stir welding may include a strong pin including PCBN that is moved along a joint between two pieces of material to super-plastically deform a portion of each piece of material and weld the two pieces together. Other applications may include using PCBN for cutting tools, drilling tools, or machining tools, such as tools for machining tool steel, case-hardened steel and high-speed steel, welding alloys, cast iron and others.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments of the present disclosure relate to methods of sintering a binderless cBN body that includes providing a boron nitride particle mixture into a pressure chamber, the boron nitride particle mixture having a first type of boron nitride particles and boron nitride filler particles, and the boron nitride filler particles having a different size and/or type than the first type of boron nitride particles, and sintering the boron nitride particle mixture in the pressure chamber to form the cBN body, where the sintering includes generating a pressure in the pressure chamber of less than 7.7 GPa and heating the boron nitride particle mixture to a temperature ranging from about 1900° C. to about 2300° C., wherein the cBN body has a density of at least 97 percent.

In another aspect, embodiments of the present disclosure relate to a method of making a cBN body that includes providing a boron nitride particle mixture into a pressure chamber, generating a pressure in the pressure chamber ranging from about 7 GPa to less than 7.7 GPa, and heating the pressure chamber to a temperature ranging from about 1900° C. to about 2300° C., wherein the cBN body has at least 98 percent composition cBN.

In yet another aspect, embodiments of the present disclosure relate to sintered binderless cBN bodies having a plurality of bonded together cBN grains, a density of at least 99 percent, and a Vickers hardness of greater than 38 GPa, wherein cBN forms at least 98 percent composition of the sintered binderless cBN body.

Other aspects and advantages of the claimed subject matter will be apparent from the following description and the appended claims.

BRIEF DESCRIPTION OF DRAWINGS

The accompanying drawings, together with the specification, illustrate example embodiments of the disclosed subject matter, and, together with the description, serve to explain principles of the disclosed subject matter.

DETAILED DESCRIPTION

Figure 1:
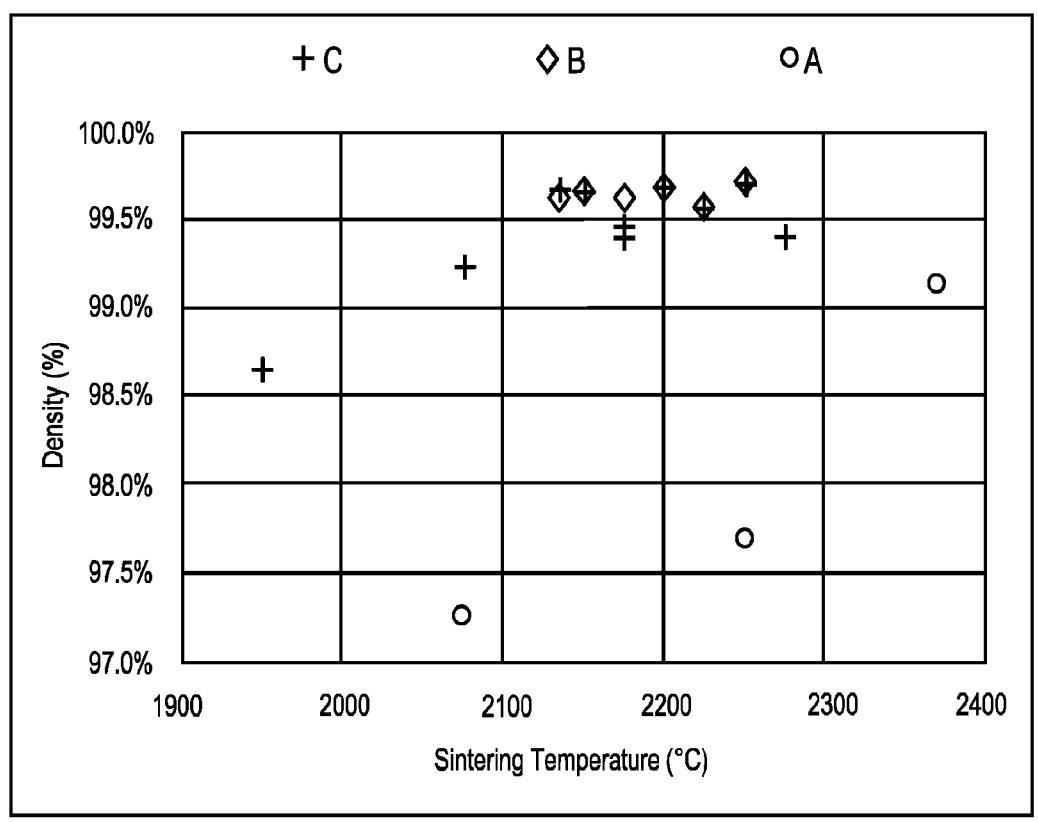
FIG. 1 is a graph of the theoretical densities of binderless cBN bodies sintered from boron nitride particle mixtures according to embodiments of the present disclosure and from a conventional boron nitride particle mixture.

In the following detailed description, only certain example embodiments of the disclosed subject matter are shown and described, by way of illustration. As those skilled in the art would recognize, the disclosed subject matter may be embodied in many different forms and should not be construed as being limited to the embodiments set forth herein. Like reference numerals designate like elements throughout the specification.

According to embodiments of the present disclosure, sintered binderless cubic boron nitride (cBN) bodies having high density and high hardness may be formed by sintering boron nitride particles under relatively low pressure conditions by using boron nitride starting material compositions discussed herein. The resulting sintered binderless cBN bodies substantially include bonded together grains of cBN and may include minimal amounts of residual materials or impurities (e.g., forming less than 3 percent, less than 1 percent, or less than 0.5 percent of the sintered body composition). For example, sintered binderless cBN bodies according to embodiments disclosed herein may have at least 97 percent composition of cBN, e.g., including greater than 98 percent composition cBN and greater than 99 percent composition cBN, such as 99.8 percent composition cBN, which is present as bonded together and interconnected grains of cBN. As used herein, the term "particle" refers to the powder starting material employed prior to sintering, while the term "grain" refers to discernible superabrasive regions subsequent to sintering.

To sinter a binderless cBN body according to embodiments disclosed herein, a boron nitride particle mixture (which also may be referred to as the starting material) may be placed in a protective container, which in turn, may be placed in a working chamber of a suitable high pressure, high temperature press apparatus. The container and its contents may then be subjected to elevated pressure and temperature conditions to sinter the binderless cBN body. Sintered binderless cBN bodies may be prepared using the same equipment generally used for the formation of polycrystalline cubic boron nitride. For example, binderless cBN bodies according to embodiments of the present disclosure may be prepared using any suitable press (e.g., a high-pressure high-temperature (HPHT) press), such as a cubic press, a belt press, a toroid press, or a multi-anvil press, and other know presses.

While presses known for sintering materials at high temperatures and high pressures may have a variety of shapes, sizes and configurations of components, presses generally include a "pressure chamber" for holding the starting material to be sintered, where starting material loaded into the pressure chamber may be subjected to increased pressures and temperatures for sintering. Pressure chambers may include one or more components, e.g., components that are movable relative to one another, sealing components, and components having concentric or overlapping walls, to name a few, and may have different sizes and shapes. As used herein, a pressure chamber may include one or more configurations of a container that is capable of holding starting material while allowing heat and pressure to be transferred to the starting material. A pressure chamber may be formed as a non-removable portion of a press, or a pressure chamber may be a removable portion, where the pressure chamber may be removed from and loaded into a press.

Presses have previously been used to sinter polycrystalline cubic boron nitride bodies from a starting material mixture of cBN particles and metal binder particles at temperatures and pressures of about 1200-1500° C. and 4-7 GPa, respectively, and to sinter binderless cBN bodies (from a starting material mixture without a metal binder) at temperatures and pressures of greater than 1900° C. and greater than 7.7 GPa, respectively. However, according to embodiments disclosed herein, presses may be used to sinter binderless cBN bodies at pressures less than 7.7 GPa and temperatures ranging from about 1900° C. to 2300° C., while also providing sintered binderless cBN bodies having comparable or greater densities and/or hardness to the densities and hardness of previous cBN bodies sintered at higher pressures.

For example, according to embodiments of the present disclosure, a method of making a binderless cBN body may include providing a boron nitride particle mixture into a pressure chamber, generating a pressure in the pressure chamber of less than 7.7 GPa (e.g., ranging from about 6.8 GPa to less than 7.7 GPa, such as about 7 GPa), and heating the pressure chamber to a temperature ranging from about 1900° C. to about 2300° C. to sinter the boron nitride particle mixture into a sintered binderless cBN body having at least 98 percent composition cBN. The remaining composition of the resulting sintered binderless cBN body may include residual materials from sintering and/or impurities, for example, carbides from the equipment used to mix the boron nitride particle mixture and/or oxides formed under the processing conditions. Further, the resulting sintered binderless cBN body may have a density of at least about 97 percent (e.g., greater than 98.0 percent, greater than 98.5 percent, greater than 99.0 percent, or greater than 99.5 percent density) and/or a Vickers hardness of at least about 37 GPa (e.g., greater than 38 GPa or greater than 40 GPa).

To form sintered binderless cBN bodies at relatively lower pressures (less than 7.7 GPa) and still result in high density and hardness (e.g., densities of at least about 97 percent and Vickers hardness of at least about 37 GPa), the boron nitride starting material composition may be designed to minimize the volume change resulting from the sintering process. In other words, by designing the boron nitride starting material to undergo less volume change during sintering, lower pressures may be used for the sintering while still resulting in sintered binderless cBN bodies having high density and hardness. Volume change between a starting material and resulting sintered body may occur from phase transformations in the starting material and/or densification of the starting material particles. Densification during the sintering process may result from the shape and/or size of the starting particles changing with the formation of grain boundaries and at the same time, the shape, size and/or amount of pores between the starting particles changing, thereby reducing the relative amount of pore volume to particle volume. Thus, by designing the composition of the boron nitride starting material to have relatively increased density and/or less volume change due to phase transformations, the overall volume change between the starting material and the sintered body may be reduced, and the pressure used for sintering may be lowered.

According to embodiments of the present disclosure, a boron nitride particle mixture may be designed to undergo less volume change during sintering by forming the boron nitride particle mixture from a first type of boron nitride particles and boron nitride filler particles, where the boron nitride filler particles have a different size and/or type than the first type of boron nitride particles. For example, a first type of boron nitride particles may include cBN particles having a selected particle size range and/or selected average particle size, and the boron nitride filler particles may include hexagonal boron nitride ("hBN") particles and/or cBN particles having a different particle size (different particle size range and/or average particle size) from the first type of boron nitride particles.

In some embodiments, a first type of boron nitride particles may include a single cut of coarse cBN particles having a particle size ranging from about 12 to 22 microns under a normal distribution, and the boron nitride filler may include fine cBN particles having an average particle size less than the first type of boron nitride particles, such as an average particle size of about 2 microns or less. Optionally, the boron nitride particle mixture may further include a third cut of cBN particles having an average particle size different from the coarse cubic boron nitride particles and the fine cubic boron nitride particles.

Embodiments of the present disclosure may include a boron nitride particle mixture having cBN particles with a multi-modal particle size distribution, including for example, a bi-modal particle size distribution (i.e., particles with two average sizes) or a tri-modal particle size distribution (i.e., particles with three average sizes). For example, a boron nitride particle mixture of cBN particles having a bi-modal particle size distribution may include cBN particles having an average particle size within a range of about 12 to 22 microns and cBN particles having an average particle size within a range of about 0.1 to 12 microns. Some embodiments may include use of a boron nitride particle mixture having cBN particles with a close packed tri-modal distribution, such as a first cut of cBN particles having an average particle size ranging from 12 to 22 microns, a second cut of cBN particles having an average particle size ranging from 2 to 4 microns, and a third cut of cBN particles having an average particle size ranging from 0.1 to 1 micron.

Boron nitride particle mixtures having cBN particles with a multi-modal particle size distribution may include two or more cuts of cBN particles with different particle sizes, where a majority (e.g., greater than 50 percent) of the composition of the multi-modal cBN particles is a coarse cut of cBN particles having an average particle size ranging from 12 to 22 microns. For example, in embodiments having a tri-modal distribution of cBN particles, the tri-modal cBN particle mixture may include between 70 and 90 percent composition (e.g., about 85 percent composition) of coarse cut cBN particles having an average particle size ranging from 12 to 22 microns, between 5 and 15 percent composition (e.g., about 7 percent composition) of a second cut cBN particles having an average particle size ranging from 2 to 4 microns, and between 5 and 15 percent composition (e.g., about 8 percent composition) of a third cut cBN particles having an average particle size ranging from 0.1 to 1 micron. In some embodiments, tri-modal cBN particle mixtures may include a majority composition of coarse cut cBN particles and a substantially equal amount by composition of two cuts of cBN particles having different average particle sizes. In some embodiments, tri-modal cBN particle mixtures may include a majority composition of coarse cut cBN particles and unequal amounts by composition of two cuts of cBN particles having different average particle sizes (e.g., where a second cut with a relatively larger average particle size forms a greater percent composition than a third cut with a relatively smaller average particle size, or where a second cut with a relatively smaller average particle size forms a greater percent composition than a third cut with a relatively larger average particle size).

Mixing cBN particles having different particle sizes to form a boron nitride particle mixture may allow for closer packing between the particles in the boron nitride starting material. Further, mixing cBN particles having larger differences in particle size, e.g., mixing coarse cBN particles and fine cBN particles, may allow for closer packing of the starting material than mixing cBN particles having smaller differences in particle size, e.g., cBN particles with a bi-modal particle size distribution with a difference in average particle size between the two particle sizes ranging from less than 50 percent difference, less than 25 percent difference, or less than 15 percent difference.

In some embodiments, hBN particles may be used as boron nitride filler, either alone or in combination with other boron nitride filler material. For example, in some embodiments, a first type of boron nitride particles may include cBN particles, and hBN particles, alone, may form the boron nitride filler. In some embodiments, a first type of boron nitride particles may include cBN particles having a first average particle size, and the boron nitride filler may include hBN particles and cBN particles having a second average particle size, smaller than the first average particle size. HBN particles may act as a lubricator in a boron nitride particle mixture, which may help with particle packing and improve green density.

HBN particles in a boron nitride particle mixture may have an average particle size less than or equal to an average particle size of a cBN particle constituent of the boron nitride particle mixture. In some embodiments, hBN particles may have a particle size of less than 5 microns, e.g., ranging from greater than 0 to about 2 microns.

A boron nitride particle mixture may include at least about 50 percent by weight of a first type of boron nitride particles, e.g., cBN particles ranging in size from about 12 to 22 microns, and less than 50 percent by weight of a boron nitride filler material. For example, a boron nitride particle mixture may include between 75 and 90 percent by weight (e.g., about 80 percent to about 85 percent by weight) of coarse cBN particles and between 10 and 20 percent by weight (e.g., about 15 percent by weight) fine cBN particles and/or between 5 and 20 percent by weight (e.g., about 15 percent by weight) hBN particles. In some embodiments, a boron nitride particle mixture may include 50 percent by weight or more of cBN particles and less than 50 percent by weight of hBN particles. Because hBN particles undergo a large volume change during sintering due to phase transformation from hBN to cBN, in some embodiments, hBN may form less than 20 percent by weight (e.g., 15 percent by weight or less, 10 percent by weight or less, or about 5 percent by weight) of a boron nitride particle mixture.

Using boron nitride particle mixtures disclosed herein as the starting material for forming sintered binderless cBN bodies may reduce the volume change between the volume of the starting material and the volume of the sintered binderless cBN body resulting from the sintering process. According to embodiments of the present disclosure, the composition of a boron nitride particle mixture may be designed to form the boron nitride starting material of a sintered binderless cBN body, such that a change in volume from the boron nitride particle mixture volume to the sintered binderless cBN body volume is less than 45 percent, less than 40 percent (e.g., about 35 percent), and in some embodiments, less than 35 percent.

A boron nitride particle mixture according to embodiments of the present disclosure may be sintered into a binderless cBN body by pouring the boron nitride particle mixture into a pressure chamber of a press and generating a pressure in the pressure chamber of less than 7.7 GPa, while heating the boron nitride particle mixture to a temperature ranging from about 1900° C. to about 2300° C. For example, boron nitride particle mixtures according to embodiments of the present disclosure may be sintered at pressures of between 6.8 and 7 GPa, between 7 and 7.2 GPa, or between 7.2 and 7.6 GPa to form binderless cBN bodies.

Binderless cBN bodies sintered from boron nitride particle mixtures disclosed herein may be sintered at pressures less than 7.7 GPa and temperatures between about 1900° C. and 2300° C. while still having a density of at least 97 percent, at least 98 percent, or at least 99 percent. The density of the sintered binderless cBN bodies may be increased (e.g., to have a density of greater than 99 percent) by using a boron nitride particle mixture, as disclosed herein, as the starting material for the sintered binderless cBN bodies. For example, using multi-modal cBN particles as the starting boron nitride particle mixture may allow for improved particle packing in the starting material, which may allow for reduced volume change during the sintering process, and thereby allow for a high density resulting from a relatively lower sintering pressure. Using a mixture of cBN particles and less than 50 percent by weight of hBN particles as the starting boron nitride particle mixture may have reduced volume change during the sintering process from phase transformation between hBN to cBN (when compared to sintering a cBN body entirely from hBN starting material), and thereby allow for lower sintering pressures to be used when sintering a high density binderless cBN body.

Methods of sintering a binderless cBN body may include powder packing a boron nitride particle mixture within a pressure chamber prior to subjecting the boron nitride particle mixture to elevated pressures and temperatures. For example, in some embodiments, a boron nitride particle mixture starting material may be loaded into a pressure chamber of a press, and the pressure chamber holding the boron nitride particle mixture may be vibrated to powder pack the boron nitride particle mixture. After vibrating, the boron nitride particle mixture may be subjected to elevated pressures and temperatures for sintering the powder packed boron nitride particle mixture into a sintered binderless cBN body.

In some embodiments, a method of sintering a binderless cBN body may include cold isostatic pressing a boron nitride particle mixture prior to subjecting the boron nitride particle mixture to elevated pressures and temperatures. For example, in some embodiments, a boron nitride particle mixture starting material may be loaded into and sealed within a flexible mold, and pressure (e.g., hydraulic pressure) may be applied around the sealed flexible mold to provide substantially uniform compaction of the boron nitride particle mixture and relatively uniform density within the compacted body. Optionally, in some embodiments, the boron nitride particle mixture may be powder packed prior to cold isostatic pressing. The compacted body of the boron nitride particle mixture may then be loaded into a pressure chamber of a press and subjected to elevated pressures and temperatures for sintering the compacted boron nitride particle mixture into a sintered binderless cBN body. In some embodiments, a boron nitride particle mixture may be loaded into a high pressure press and subjected to pressures ranging from 1 to 7 GPa to pack the boron nitride particle mixture and improve the green density prior to sintering. After being subjected to pressures ranging from 1 to 7 GPa, the packed boron nitride particle mixture may then be sintered to form a sintered binderless cBN body.

Sintered binderless cBN bodies formed from boron nitride particle mixtures according to embodiments of the present disclosure may have high densities of at least 98 percent, including greater than 98.5 percent, greater than 99 percent, and greater than 99.5 percent, depending on, for example, the composition of the boron nitride particle mixture and the sintering temperature and pressure.

FIG. 1 shows an example of the theoretical densities of binderless cBN bodies sintered from different boron nitride particle mixtures at 7 GPa and different temperatures. The tested boron nitride particle mixtures include a conventional single cut cBN particle mixture, shown as boron nitride particle mixture A, and boron nitride particle mixtures according to embodiments of the present disclosure, shown as boron nitride particle mixtures B and C. Boron nitride particle mixture A includes a single cut of cBN particles having a normal distribution, where the cBN particles have a particle size ranging from 12 to 22 microns. According to an embodiment, boron nitride particle mixture B includes a mixture with 85 percent by weight of cBN particles with a particle size ranging from 12 to 22 microns and 15 percent by weight of cBN particles with a particle size ranging from greater than 0 to 2 microns. According to an embodiment, boron nitride particle mixture C includes a mixture with 85 percent by weight of the boron nitride particle mixture B and 15 percent by weight of hBN particles. As such, boron nitride particle mixture C may include a mixture with about 72 percent by weight of cBN particles with a particle size ranging from 12 to 22 microns, about 13 percent by weight of cBN particles with a particle size ranging from greater than 0 to 2 microns, and about 15 percent by weight of hBN particles.

As shown in FIG. 1, boron nitride particle mixture A was unable to result in a high density (with a theoretical density of at least 98 percent) binderless cBN body when sintered at 7 GPa and temperatures under 2250° C. Instead, boron nitride particle mixture A resulted in a high density of about 99.2 percent when sintered at 7 GPa and under temperatures of about 2370° C.

In contrast, particle mixtures according to embodiments of the present disclosure and shown in FIG. 1, boron nitride particle mixture B and boron nitride particle mixture C, were able to result in high density (with a theoretical density of at least 98 percent) binderless cBN bodies when sintered at 7 GPa and temperatures ranging between 1900° C. and 2300° C. For example, when sintered at 7 GPa and under temperatures ranging from about 2140° C. to 2250° C., boron nitride particle mixture B resulted in a binderless cBN bodies having high densities ranging between about 99.5 percent and about 99.7 percent. When sintered at 7 GPa and about 1950° C., boron nitride particle mixture C resulted in a binderless cBN body having a high density of about 98.6 percent. When sintered at 7 GPa and under temperatures ranging from about 2070° C. to about 2270° C., boron nitride particle mixture C resulted in binderless cBN bodies having high densities ranging from greater than 99.2 percent to about 99.7 percent.

FIG. 1 shows selected examples of boron nitride particle mixtures according to embodiments of the present disclosure sintered under 7 GPa and temperatures ranging between 1900° C. and 2300° C. However, other boron nitride particle mixtures according to embodiments of the present disclosure may be sintered under similar conditions (e.g., pressures of less than 7.7 GPa, less than 7.5 GPa, or less than 7.2 GPa, such as between 6.9 GPa and 7.1 GPa, and temperatures ranging between about 1900° C. and about 2300° C.) to also result in high density binderless cBN bodies.

Further, sintered binderless cBN bodies formed from boron nitride particle mixtures according to embodiments of the present disclosure may have a Vickers hardness of greater than 30 GPa, greater than 35 GPa, and greater than 38 GPa.

As discussed herein, using boron nitride particle mixtures according to embodiments of the present disclosure to form sintered binderless cBN bodies may allow for sintering at relatively lower pressures (and optionally in combination with lower temperatures) when compared with previously used boron nitride starting material. Sintered binderless cBN bodies formed according to embodiments disclosed herein may further have improved material properties, notwithstanding the lower sintering pressure used to form the binderless cBN bodies, due in part to the composition of the starting material and its packing efficiency. For example, reverse phase transformation from cBN to hBN in cBN starting material may be avoided by using starting material and sintering methods according to embodiments of the present disclosure, which may result in sintered binderless cBN bodies having improved hardness (due to reduced presence of hBN in the sintered binderless cBN bodies).

Figures 2, 3:
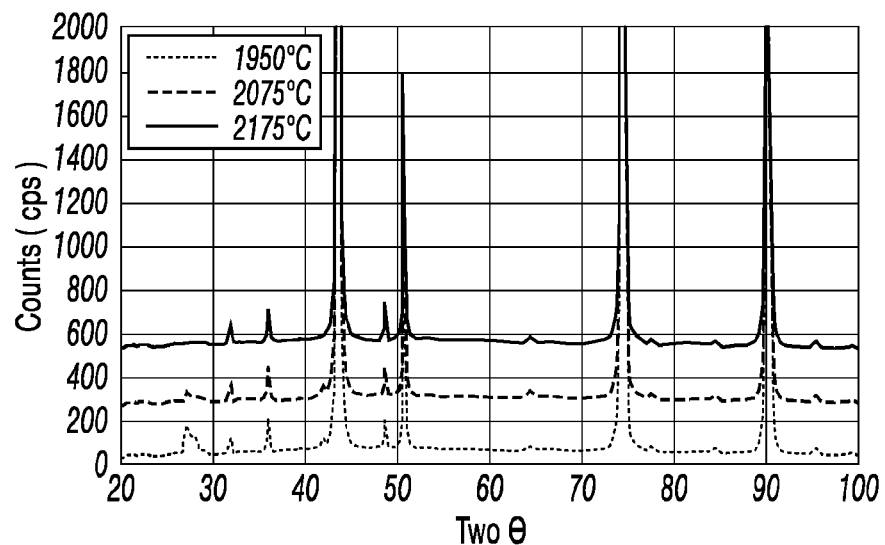
FIG. 2 shows an x-ray diffraction spectrum of sintered binderless cBN bodies sintered from a boron nitride particle mixture according to embodiments of the present disclosure under different temperatures.
FIG. 3 shows a table of the compositions of the sintered binderless cBN bodies of FIG. 2.

FIG. 2 shows x-ray diffraction results of sintered binderless cBN bodies sintered from a boron nitride particle mixture according to embodiments of the present disclosure sintered under different temperatures and under a pressure of 7 GPa. The boron nitride particle mixture included a mixture of cBN particles having a particle size ranging between 12 and 22 microns, cBN particles having a particle size ranging from greater than 0 microns to about 2 microns, and hBN particles. FIG. 3 shows the composition of the sintered binderless cBN bodies resulting from sintering the boron nitride particle mixture at different temperatures, as calculated from the x-ray diffraction measurements. When sintered at 1950° C., the resulting sintered binderless cBN body has about 98.5 percent of its composition cBN, 1.2 percent hBN, and 0.35 percent residual materials. When sintered at 2075° C., the resulting sintered binderless cBN body has about 99 percent of its composition cBN, 0.41 percent hBN, and 0.63 percent residual materials. When sintered at 2175° C., the resulting sintered binderless cBN body has about 99.8 percent of its composition cBN, 0.02 percent hBN, and 0.20 percent residual materials.

Figure 4:
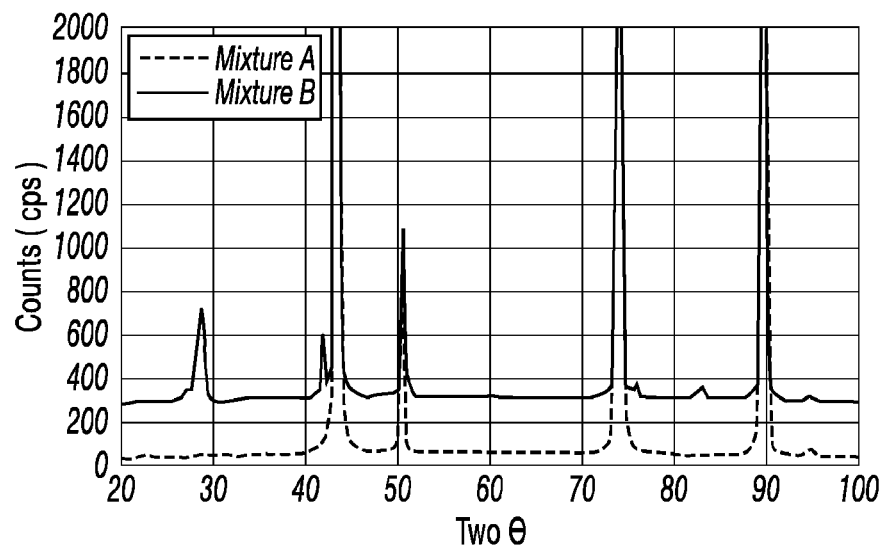
FIG. 4 shows an x-ray diffraction spectrum for comparative samples of sintered binderless cBN bodies.
Figure 5:
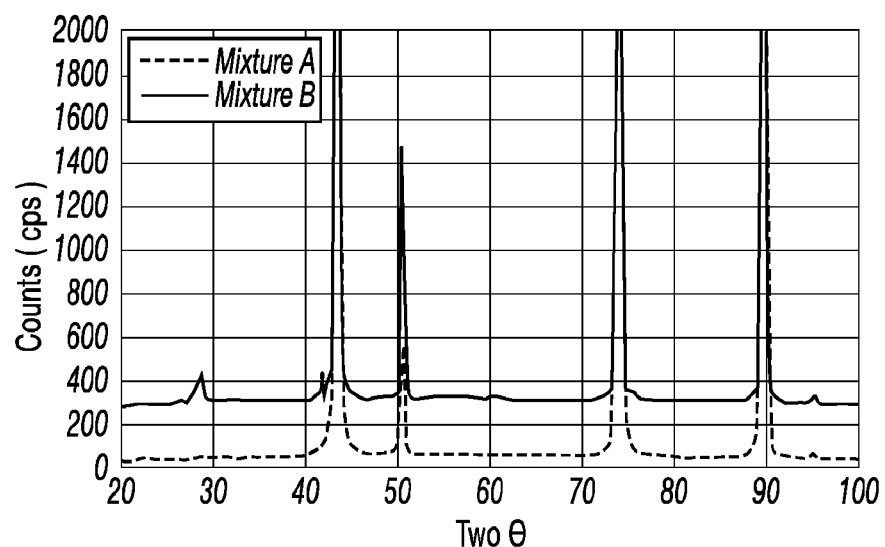
FIG. 5 shows an x-ray diffraction spectrum for comparative samples of sintered binderless cBN bodies.

FIGS. 4 and 5 show x ray diffraction measurements taken for additional examples of sintered binderless cBN bodies sintered from a single coarse cut cBN particle mixture having cBN particles with an average particle size ranging from 12 to 22 microns and a single fine cut cBN particle mixture having cBN particles with an average particle size ranging from greater than 0 to 2 microns under different temperatures. According to one or more embodiments, the results shown in FIG. 4 include the x-ray diffraction patterns for 1) a sintered binderless cBN body sintered from a single fine cut cBN particle mixture (Mixture A) having fine cBN particles with an average particle size ranging between greater than 0 and 2 microns and 2) a sintered binderless cBN body sintered from a single coarse cut cBN particle mixture (Mixture B) having coarse cBN particles with an average particle size ranging from 12 to 22 microns, where Mixtures A and B were each sintered at 2075° C. The results shown in FIG. 5 include the x-ray diffraction patterns for Mixtures A and B each sintered at 2370° C.

As shown in FIGS. 4 and 5, peaks in the x-ray diffraction patterns at the angular position 2θ of around 28 to 29 represent presence of hBN. Accordingly, FIGS. 4 and 5 show that fine cut cBN particles may be densified well and sintered to form binderless cBN bodies having trace amounts of (or no amount of) hBN, whereas when coarse cut cBN particles are densified and sintered to form binderless cBN bodies, hBN is present. Further, as shown in FIGS. 4 and 5, the intensity of the peak at the angular position 2θ of around 28 to 29 resulting from the binderless cBN body sintered from Mixture B at 2075° C. is greater than the intensity of the peak at the angular position 2θ of around 28 to 29 resulting from the binderless cBN body sintered from Mixture B at 2370° C., thereby indicating that the concentration of the hBN phase in the sintered binderless cBN body sintered from Mixture B at 2075° C. may be greater than the concentration of the hBN phase in the sintered binderless cBN body sintered from Mixture B at 2370° C.

According to embodiments of the present disclosure, sintered binderless cBN bodies formed according to methods disclosed herein may have less than 1.5 percent composition hBN, less than 1 percent composition hBN, or less than 0.5 percent composition hBN. For example, according to embodiments of the present disclosure, sintered binderless cBN bodies sintered from a boron nitride particle mixture having a first type of cBN particles (e.g., cBN particles with a particle size between 12 and 22 microns) and less than 50 percent by weight of a boron nitride filler material (e.g., boron nitride particles of a different size and/or type than the first type of cBN particles) under sintering conditions with pressures of ranging between about 6.9 GPa and 7.6 GPa (e.g., about 7 GPa, 7.1 GPa, or 7.2 GPa) and temperatures of about 2000° C. and 2200° C. may have a composition including between 0 and 0.5 percent composition hBN and greater than 99 percent composition cBN.

Sintered binderless cBN bodies formed according to methods of the present disclosure may be substantially entirely made of cBN and have both high density and high hardness. For example, in some embodiments, sintered binderless cBN bodies formed according to methods of the present disclosure may include a plurality of bonded together cBN grains, wherein cBN forms at least 98 percent composition of the sintered binderless cBN body, and have a density of at least 99 percent and a Vickers hardness of greater than 38 GPa. In some embodiments, sintered binderless cBN bodies formed according to methods of the present disclosure may have less than 1 percent composition hBN.

Further, binderless cBN bodies sintered according to embodiments of the present disclosure may have relatively larger sizes when compared with binderless cBN bodies sintered at pressures of 7.7 GPa or more. For example, in some embodiments, a sintered binderless cBN body may have at least one dimension (e.g., dimensions in an x, y, and/or z direction along an x-y-z-coordinate system) extending a distance of at least 5 mm, at least 10 mm, at least 20 mm or more. In some embodiments, sintered binderless cBN bodies sintered at pressures of less than 7.7 GPa (e.g., in some embodiments, using a sintering pressure of about 7 GPa) may have a volume of at least 300 mm$^3$, at least 500 mm$^3$, at least 700 mm$^3$, or at least 1000 mm$^3$. As discussed herein, sintered binderless cBN bodies according to embodiments of the present disclosure may be formed to have a density of at least 98 percent using sintering pressures of less than 7.7 GPa. Using relatively lower sintering pressures may further allow for forming sintered binderless cBN bodies to have a relatively larger size when compared with binderless cBN bodies sintered at sintering pressure of about 7.7 GPa or more in addition to having densities of 98 percent or more.

Binderless cBN bodies sintered according to embodiments of the present disclosure may be used for cutting or machining tools, and may be sintered to have a shape and size according to the end application.

Figure 6:
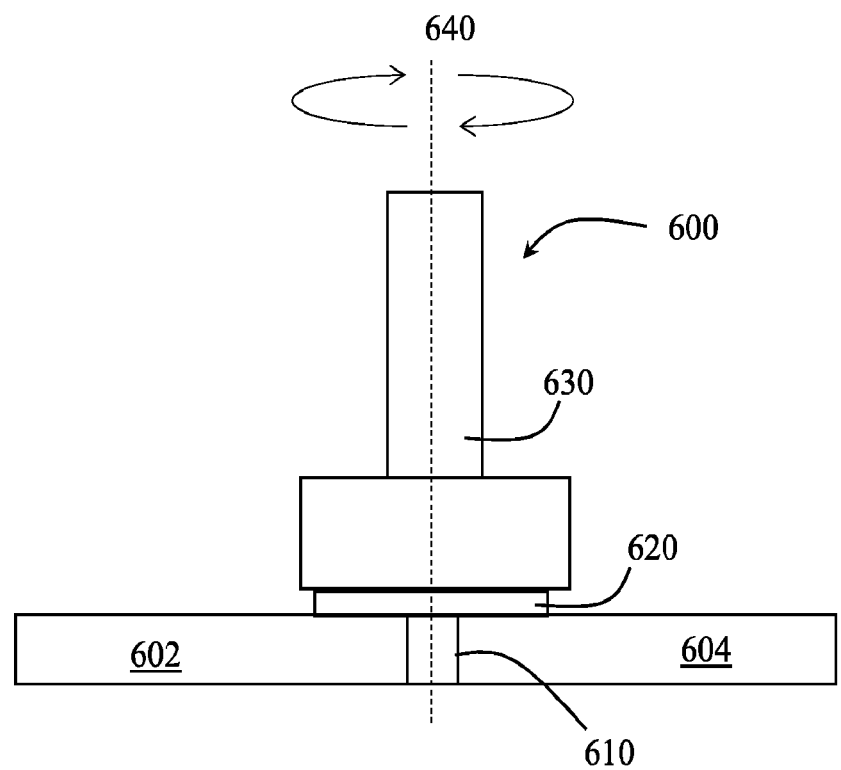
FIG. 6 shows a tool having a sintered binderless cBN material according to embodiments of the present disclosure.

FIG. 6 shows an example of a tool with which a sintered binderless cBN body according to embodiments of the present disclosure may be used. The tool is a friction stir welding (FSW) tool 600, which may mechanically join two metallic materials 602, 604, by plastically deforming and mixing the materials being joined at sub-melting temperatures. The FSW tool 600 includes a spindle 630, a shoulder 620, and a pin 610 extending from the shoulder 620. The pin 610 penetrates and "stirs" the materials to be joined. Depending on the depth of penetration, the shoulder 620 may also contact and "stir" the materials to be joined.

In an embodiment, the FSW tool 600 drives the spindle 630 to rotate the pin 610 about an axis 640. As the pin 610 rotates, the pin is moved to contact the materials 602, 604 to be joined, e.g., along a joint or interface between the materials 602, 604, or if the materials 602, 604 are overlapping, the pin 610 may be moved to contact the upper layer of overlapping material and plunged a depth below the interface between the overlapping materials. Frictional heat is generated at the contact area between the rotating pin and the materials 602, 604 to be joined. The friction-generated heat heats the materials 602, 604 to temperatures high enough to soften and make malleable the materials 602, 604, but less than the melting temperature of the materials 602, 604. As the materials 602, 604 soften from the frictional heat, the rotating pin 610 may plunge a depth into the materials 602, 604, while the rotating motion of the pin 610 mixes the softened materials 602, 604 together. The rotating pin 610 may extend a depth into the materials 602, 604 such that the shoulder 620 also contacts and generates frictional heat along the surfaces of the materials 602, 604. As the FSW tool 600 travels along the interface between the materials 602, 604, a weld of commingled materials 602, 604 is formed. After mixing or stirring the materials 602, 604 to join them together, the pin 610 may be removed (e.g., the pin may be gradually removed or removed using a sacrificial material along the exiting area of the pin to reduce dimpling).

The pin 610 may be made of sintered binderless cBN formed according to embodiments of the present disclosure, which may provide the pin with improved wear resistance, while also maintaining strength during increased temperatures resulting from generating the frictional heat during friction stirring operations.

Figure 7:
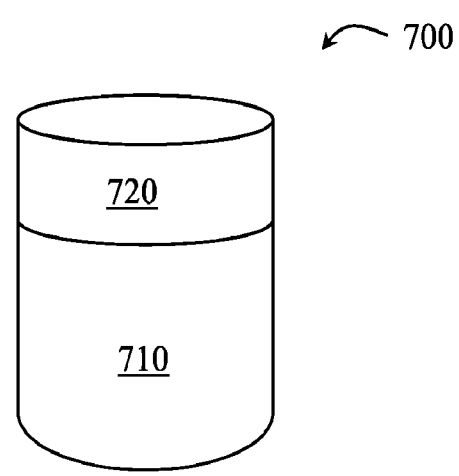
FIG. 7 shows a cutting element having a sintered binderless cBN material according to embodiments of the present disclosure.

Sintered binderless cBN bodies according to embodiments of the present disclosure may also be used to form cutting elements. For example, as shown in FIG. 7, a sintered binderless cBN body according to embodiments of the present disclosure may be bonded onto a substrate 710, such as a tungsten carbide or other metallic carbide substrate, to form a cutting layer 720 of a cutting element 700. The sintered binderless cBN body may be bonded (e.g., welded or brazed) to the substrate 710 after the sintered binderless cBN body has been sintered.

Sintered binderless cBN bodies according to embodiments of the present disclosure may be used in other machining and cutting applications, and may be used to form cutting elements or machining components that contact and cut or wear a workpiece. In some machining and/or cutting applications, sintered binderless cBN bodies according to embodiments of the present disclosure may be used to form wear resistant elements or surfaces of a machining or cutting tool, where the wear resistant surface may protect certain areas of the tool from wear during the machining and/or cutting applications.

While the present disclosure has been described with respect to a limited number of embodiments, those skilled in the art, having benefit of this disclosure, will appreciate that other embodiments may be devised which do not depart from the scope of the disclosure as described herein. In addition, aspects of particularly described embodiments may be combined with other embodiments without departing from the scope of the disclosure.

What is claimed is:

1. A method of sintering a binderless cubic boron nitride body, comprising:
   providing a boron nitride particle mixture into a pressure chamber, the boron nitride particle mixture comprising a first type of boron nitride particles and boron nitride filler particles, the first type of boron nitride particles comprising a cubic boron nitride particle mixture having a multi modal particle size distribution, the boron nitride filler particles comprising hexagonal boron nitride particles; and
   sintering the boron nitride particle mixture in the pressure chamber to form the binderless cubic boron nitride body, the sintering comprising:
      generating a pressure in the pressure chamber of less than 7.7 GPa; and
      heating the boron nitride particle mixture to a temperature ranging from 1900° C. to 2300° C.,
   wherein the binderless cubic boron nitride body has a density of at least 97 percent.

2. The method of claim 1, wherein the cubic boron nitride particle mixture comprises coarse cubic boron nitride particles having a particle size ranging from 12 to 22 microns.

3. The method of claim 1, wherein the cubic boron nitride particle mixture comprises fine cubic boron nitride particles having an average particle size less than the first type of boron nitride particles.

4. The method of claim 3, wherein the fine cubic boron nitride particles have a particle size of 2 microns or less.

5. The method of claim 3, wherein the fine cubic boron nitride particles form between 10 to 20 weight percent of the boron nitride particle mixture.

6. The method of claim 1, wherein the hexagonal boron nitride particles form between 5 to 20 weight percent of the boron nitride particle mixture.

7. The method of claim 1, further comprising vibrating the boron nitride particle mixture in the pressure chamber prior to sintering.

8. The method of claim 1, further comprising cold isostatic pressing the boron nitride particle mixture prior to sintering.

9. The method of claim 1, wherein the boron nitride filler particles form less than 50 percent by weight of the boron nitride particle mixture.

10. The method of claim 1, wherein the cubic binderless boron nitride body has a Vickers hardness of greater than 30 GPa.

11. The method of claim 1, wherein the cubic binderless boron nitride body has less than 1 percent composition hexagonal boron nitride.

12. A method of making a binderless cubic boron nitride body, comprising:
   providing a boron nitride particle mixture into a pressure chamber, the boron particle mixture comprising hexagonal boron nitride particles and a cubic boron nitride particle mixture having a multi modal particle size distribution;
   generating a pressure in the pressure chamber ranging from 7 GPa to less than 7.7 GPa; and
   heating the pressure chamber to a temperature ranging from 1900° C. to 2300° C.,
   wherein the binderless cubic boron nitride body has at least 98 percent composition cubic boron nitride.

13. The method of claim 12, wherein the binderless cubic boron nitride body has a Vickers hardness of greater than 38 GPa.

14. The method of claim 12, wherein a change in volume from the boron nitride particle mixture volume in the pressure chamber to the binderless sintered cubic boron nitride body volume is less than 25 percent.

15. The method of claim 14, further comprising cold isostatic pressing the boron nitride particle mixture prior to generating the pressure and heating.

* * * * *